(12) United States Patent
Takahashi et al.

(10) Patent No.: US 6,456,691 B2
(45) Date of Patent: Sep. 24, 2002

(54) X-RAY GENERATOR

(75) Inventors: Sadayuki Takahashi, Tokyo; Masaru Kuribayashi, Akishima; Naohisa Osaka, Ome, all of (JP)

(73) Assignee: Rigaku Corporation, Tokyo (JP)

( * ) Notice: Subject to any disclaimer, the term of this patent is extended or adjusted under 35 U.S.C. 154(b) by 0 days.

(21) Appl. No.: 09/797,101

(22) Filed: Mar. 1, 2001

(30) Foreign Application Priority Data

Mar. 6, 2000 (JP) ........................................ 2000-059916
Mar. 24, 2000 (JP) ........................................ 2000-083390

(51) Int. Cl.[7] ............................................... H01J 35/00
(52) U.S. Cl. ........................................ 378/122; 378/136
(58) Field of Search .................................. 378/122, 136

(56) References Cited

U.S. PATENT DOCUMENTS 5,729,583 A * 3/1998 Tang ........................... 378/122
5,773,921 A * 6/1998 Keesmann et al. ......... 313/309

FOREIGN PATENT DOCUMENTS

| JP | 10-012124 | 1/1998 |
| JP | 10-149760 | 6/1998 |
| JP | 10-199398 | 7/1998 |
| JP | 11-111158 | 4/1999 |
| JP | 11-194134 | 7/1999 |
| JP | 11-260244 | 9/1999 |

* cited by examiner

Primary Examiner—Craig E. Church
(74) Attorney, Agent, or Firm—Frishauf, Holtz, Goodman & Chick, P.C.

(57) ABSTRACT

An X-ray generator includes a cathode having an emitter made of carbon nanotubes which emits electrons by field emission and thus becomes a cold cathode electron emission source. In the invention using the carbon nanotubes, any one of the following three forms is adopted to control the tube current apart from the electron-focusing control. The first form is that a takeoff electrode is disposed near the cathode and the Wehnelt potential and the takeoff electrode potential are controlled independently. The second form is that an electron emission source is disposed behind the cathode and the electron emission source emits electrons which collide against the back of the cathode so that the cathode temperature is controlled in a range of the room temperature to about 100 degrees Celsius to regulate an amount of electron emission from the cathode. The third form is that the cathode has a heater so that the cathode temperature is controlled in a range of the room temperature to about 100 degrees Celsius to regulate an amount of electron emission from the cathode.

14 Claims, 7 Drawing Sheets

X-RAY GENERATOR

BACKGROUND OF THE INVENTION

This invention relates to an X-ray generator having an improved cathode.

The conventional X-ray generator has a hot cathode which is typically made of tungsten whose operational temperature is very high as 2000 to 2300 degrees Celsius. Other than the tungsten, thorium-added tungsten or lanthanum hexaboride also have been used for the hot cathode materials. The operational temperature of those materials is 1000 to 1500 degrees Celsius which is lower than that of the tungsten but is a relatively high temperature. The hot cathode made of any materials described above requires a relatively high-power heating power supply. The hot cathode made of thorium-added tungsten or lanthanum hexaboride requires high vacuum to obtain a steady emission current. The tungsten filament requires vacuum under $1 \times 10^{-3}$ Pa, while the hot cathode made of thorium-added tungsten or lanthanum hexaboride requires vacuum under $1 \times 10^{-5}$ Pa.

Since the conventional X-ray generator has a hot cathode as described above, it has the following disadvantages: (1) With the hot cathode, a high-power heating power supply is required. A large current (e.g., ten and several amperes) must flow through the hot cathode to emit hot electrons and thus a large-current cable is required. Since a negative high voltage of several tens kV based on the ground potential is supplied to the cathode of the X-ray generator, a cable connected to the X-ray generator must bear not only a high-voltage but also a large current and heat generation. Such a large-current high-voltage cable is expensive, thick, rigid and difficult to handle. (2) Since the cathode becomes a very high temperature, the surrounding parts must be designed to bear the high temperature. (3) The cathode made of lanthanum hexaboride and so on requires high vacuum. (4) The hot cathode becomes a high temperature to discharge gas which affects the X-ray generator. Therefore, before the use of the X-ray generator, the hot cathode must be heated for a period of time to discharge gas so as to reduce gas discharge in the actual use. (5) The cathode material would slightly evaporate and scatter from the hot cathode, so that such material adheres to the target surface and causes contamination with which the characteristic X-ray of the adhering material (i.e., cathode material) is generated inadvantageously.

Incidentally, in the field other than the X-ray generator, carbon nanotubes have lately attracted attention as a cold cathode electron emission source. The carbon nanotube is one form of carbon material which has a cylindrical structure with a diameter of nanometer order. The carbon nanotubes can emit electrons by field emission under the room temperature even with the flat surface of the electron emission region (i.e., requiring no needle shape). It is known that the cold cathode electron emission source made of carbon nanotubes may be used for the electron source of the flat display, as disclosed in Japanese patent publication Nos. JP 11-194134A (1999), JP 10-199398 A (1998), JP 10-149760 A (1998) and JP 10-12124 A (1998). The cold cathode electron emission source emits electrons which collide against fluorescent substance to make a light-emitting display. Also it is known that, the carbon nanotubes may be used for the electron gun of the cathode ray tube, as disclosed in Japanese patent publication Nos. JP 11-260244 A (1999) and JP 11-111158 A (1999).

Furthermore, it is known that, other than the carbon nanotubes, fullerenes may be used for the cold cathode electron emission source, as disclosed in Japanese patent publication No. JP 10-149760 A (1998), the fullerene being another form of carbon material.

SUMMARY OF THE INVENTION

Accordingly it is an object of the invention to provide an X-ray generator in which a cold cathode electron emission source made of carbon material is used as the cold cathode so that various problems caused by the hot cathode can be solved.

It is another object of the invention to provide an X-ray generator in which a cold cathode electron emission source made of carbon material emits electrons which heat a hot cathode so that a high-voltage cable is given no large current.

An X-ray generator according to the first aspect of the invention includes a cathode having an emitter made of carbon nanotubes which emits electrons by field emission and thus becomes a cold cathode electron emission source. In the invention using the carbon nanotubes, any one of the following three forms is adopted to control the tube current apart from the electron-focusing control. The first form is that a takeoff electrode is disposed near the cathode and the Wehnelt potential and the takeoff electrode potential are controlled independently. The second form is that an electron emission source is disposed behind the cathode and the electron emission source emits electrons which collide against the back of the cathode so that the cathode temperature is controlled in a range of the room temperature to about 100 degrees Celsius to regulate an amount of electron emission from the cathode. The third form is that the cathode has a heater so that the cathode temperature is controlled in a range of the room temperature to about 100 degrees Celsius to regulate an amount of electron emission from the cathode.

The emitter made of carbon nanotubes has the following advantages as compared with the conventional hot cathode: (1) Since the cathode requires no high-temperature heating, it saves power. (2) The cathode requires no large-current cable which is used for high-temperature heating. (3) Since the cathode temperature is near the room temperature, the surrounding parts requires no countermeasure for a high temperature. (4) Since the cathode has no high-temperature region, it requires no heating operation for outgassing before the use so that the X-ray generator can be used soon. (5) If the cathode becomes a high temperature, the cathode material would evaporate and adhere to the target surface. The cathode of this invention has no such a problem and the target contamination is reduced. (6) A steady emission current is obtained under a pressure of about $1 \times 10^{-3}$ Pa so that the X-ray generator requires no high vacuum.

Fullerenes may be used instead of the carbon nanotubes. The fullerene has a polyhedral structure including pentagons and hexagons made of carbon atoms, the typical one being a spherical structure including 60 carbon atoms. Such fullerenes may be used for the cathode emitter of the X-ray generator.

An X-ray generator according to the second aspect of the invention includes a hot cathode and a cold cathode electron emission source made of carbon material (e.g., carbon nanotubes) for heating the hot cathode. The hot cathode is not a direct-heating type in which a current directly flows through the cathode to heat it by resistance, but a type in which electrons from the electron emission source collide against the cathode to heat it. The carbon nanotubes are used as the emitter of the electron emission electrode. The electron emission electrode is disposed behind and apart from the hot cathode. The electron emission electrode is -given a negative potential based on the hot cathode potential so that the electron emission electrode emits electrons which collide against the hot cathode to heat it. The negative potential is controlled to regulate the tube current of the X-ray generator. The hot cathode material is not limited to specific ones, but at least an electron emission region is made of lanthanum hexaboride preferably. Fullerenes may be used instead of the carbon nanotubes.

The X-ray generator according to the second aspect of the invention includes a hot cathode heated by electrons which are emitted by a cold cathode electron emission source made of carbon material (carbon nanotubes or fullerenes), so that a high-voltage cable is given no large current.

The X-ray generator according to the second aspect has the advantage described below as compared with that according to the first aspect. It is known that an electron emission surface made of carbon nanotubes generates uneven brightness and its hourly fluctuation, the uneven brightness of the emitter being that an electron emission strength depends upon locations on the electron emission surface. It is desirable in the X-ray generator that uneven brightness on the target is reduced as much as possible and hourly fluctuation of the X-ray intensity is reduced as much as possible, the uneven brightness on the target being that a strength of electron current colliding against the target depends upon locations on the target surface. Therefore, if the carbon nanotubes are used as the cathode as in the X-ray generator according to the first aspect, the above-described uneven brightness of the emitter and its hourly fluctuation would affect the performance of the X-ray generator. The X-ray generator according to the second aspect has no such problem.

DETAILED DESCRIPTION OF THE PREFERRED EMBODIMENTS

Figure 1:
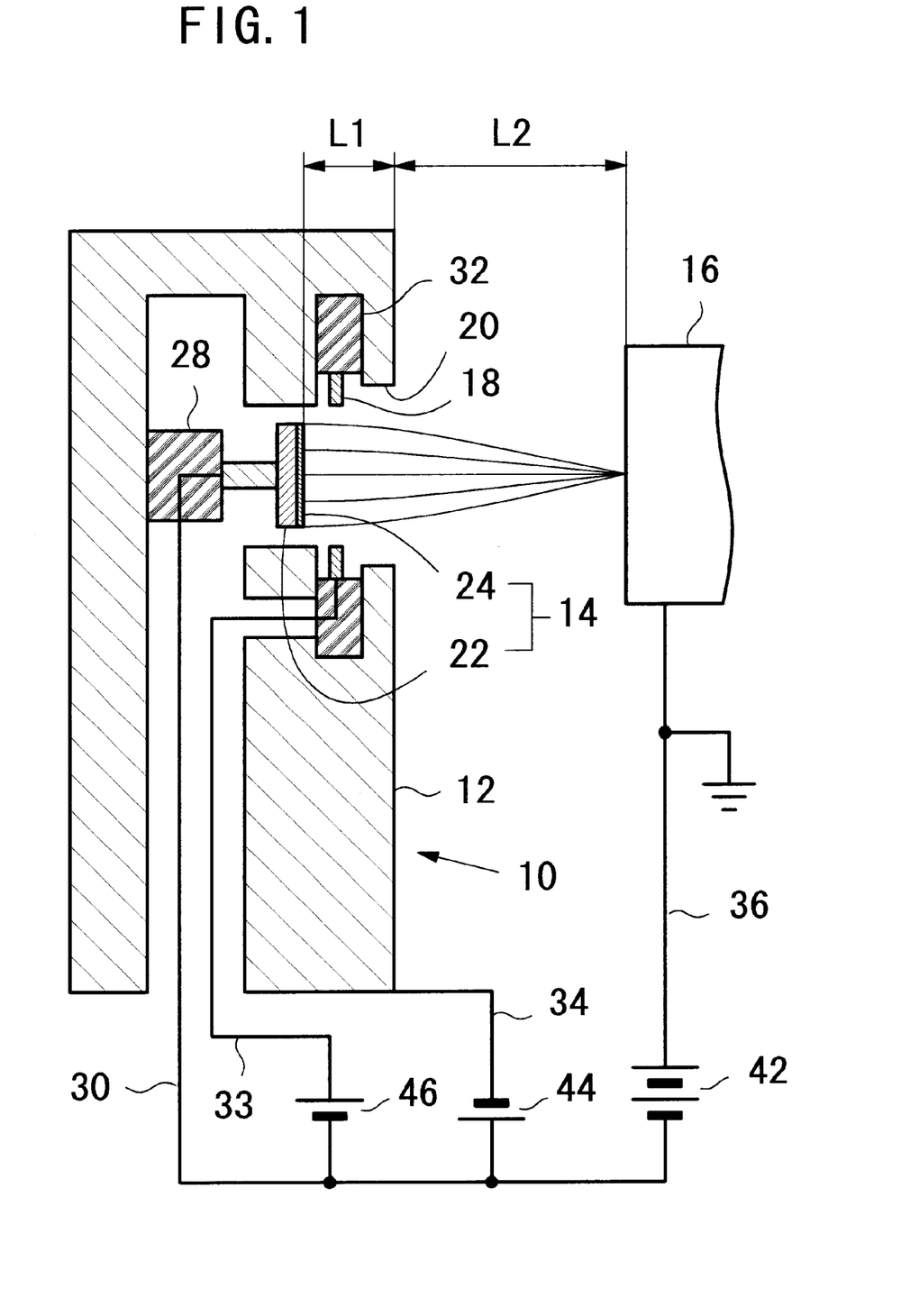
FIG. 1 is a cross-sectional view of an electron gun unit in the first embodiment of the X-ray generator according to the first aspect of this invention.

FIG. 1 is a cross-sectional view of an electron gun unit in the first embodiment of the X-ray generator according to the first aspect of this invention. This cross-sectional view illustrates the electron gun unit 10 seen from its lateral side. The electron gun unit 10 has a Wehnelt 12 within which a cathode 14 is disposed. The cathode 14 includes a cathode base 22 having a surface to which an emitter 24 is fixed. The cathode base 22 is made of a nickel plate 0.5 mm thick. The emitter 24 is for electron emission and made of carbon nanotubes. A target 16 is disposed so as to face this electron gun unit 10. The cathode 14, the takeoff electrode 18 and the target 16 make a specific electric field under which the emitter 24 emits electrons. The electrons are focused by a window 20 of the Wehnelt 12 and accelerated by the electric field between the cathode 14 and the target 16 so as to collide against the surface of the target 16 to generate X-rays. The distance L1 between the emitter 24 and the front surface of the Wehnelt 12 is 6 to 7 mm. The distance L2 between the front surface of the Wehnelt 12 and the surface of the target 16 is about 12 mm.

Figure 2:
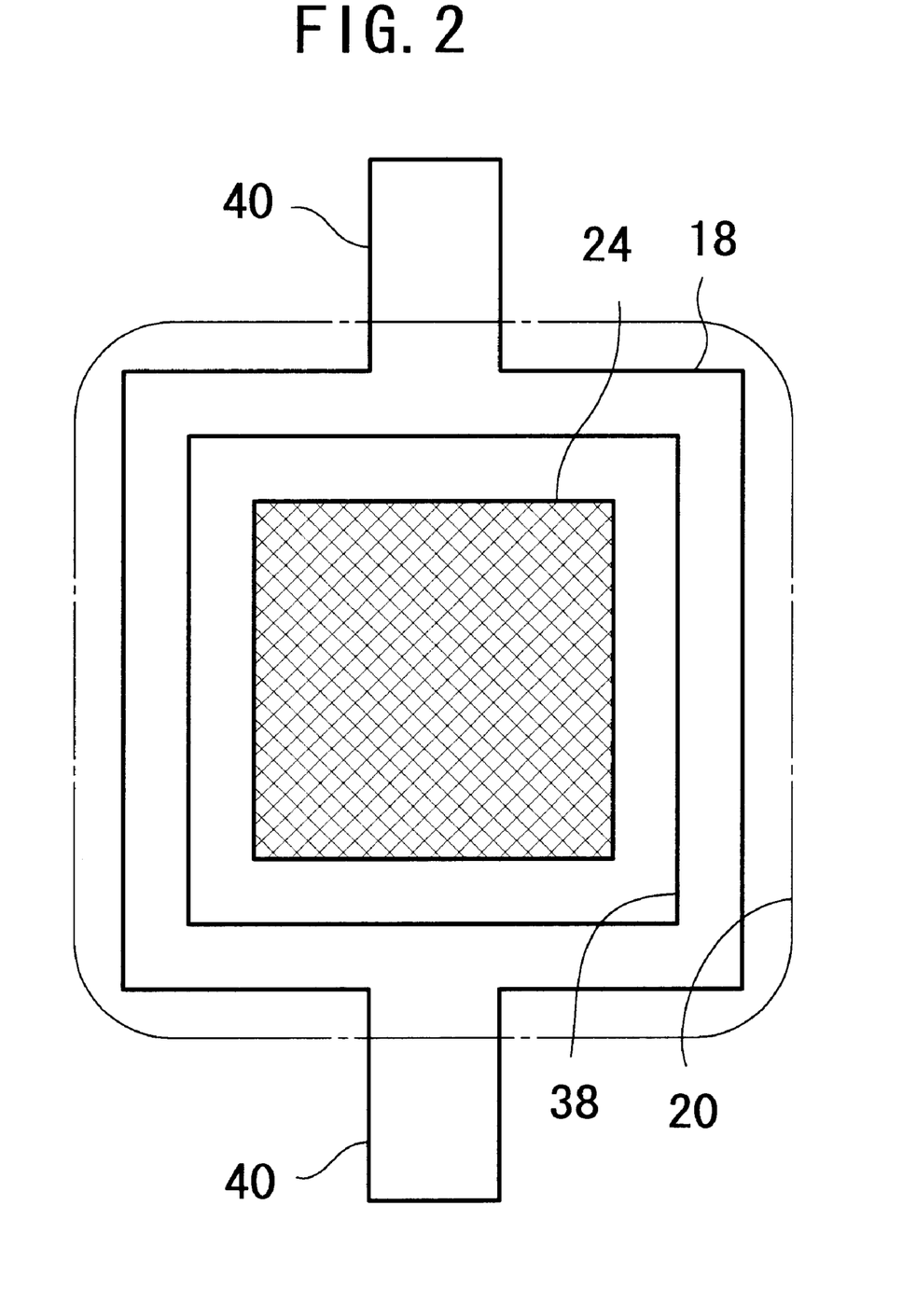
FIG. 2 is an elevation view of a takeoff electrode of the electron gun unit shown in FIG. 1.

FIG. 2 is an elevation view of the takeoff electrode 18 seen from the target side. The takeoff electrode 18 has a substantially rectangular shape and a rectangular opening 38. The takeoff electrode 18 further has two legs 40 supported by insulators 32 (see FIG. 1). Seen from the target side, the takeoff electrode 18 appears inside the Wehnelt window 20 and the emitter 24 appears inside the opening 38 of the takeoff electrode 18.

The Wehnelt window 20 has a size of about 10 mm square. The takeoff electrode opening 38 has a size of about 7 mm square. The takeoff electrode 18 is made of a plate 0.5 to 1.0 mm thick. The emitter 24 has an electrode emission region having a size of about 5 mm square.

Referring back to FIG. 1, an electric circuit of the X-ray generator will be explained. The cathode 14 is supported by an insulator 28 and connected to a cathode line 30. The takeoff electrode 18 is supported by the insulators 32 and connected to a takeoff electrode line 33. The Wehnelt 12 is connected to a Wehnelt line 34. The target 16 is connected to a target line 36.

The first power supply 42 is connected between the cathode line 30 and the target line 36, so that the target potential (i.e., tube voltage) is set zero to 60 kV based on the cathode potential. The emitter 24 of the cathode 14 emits electrons which are accelerated by the tube voltage and collide against the target 16. The second power supply 44 is connected between the cathode line 30 and the Wehnelt line 34, so that the Wehnelt potential is set zero to minus 1000 V based on the cathode potential. The emitter 24 of the cathode 14 emits electrons which are focused by the Wehnelt window 20 (its potential is negative based on the cathode 14) on the predetermined region of the surface of the target 16. The third power supply 46 is connected between the cathode line 30 and the takeoff electrode line 33, so that the takeoff electrode potential is set minus 1000 to plus 1000 V based on the cathode potential. The takeoff electrode potential is controlled so as to regulate an emitter-emitting electron current (i.e., tube current). The takeoff electrode 18 potential is ordinarily set positive based on the cathode 14 potential to regulate the tube current, while in some cases it may be set negative to restrain the tube current. With the emitter 24 made of carbon nanotubes, electron density can be high as 100 mA to 1 A per square centimeters.

The second power supply 44 controls the Wehnelt 12 potential based on the cathode 14 potential so that the electron beam can be focused on the target 16 and the focus size on it can be adjusted. On the other hand, the third power supply 46 controls the takeoff electrode 18 potential based on the cathode 14 potential so that the tube current can be regulated. With the cathode having the conventional hot filament "a filament current" is controlled to regulate the tube current, while with the emitter 24 made of carbon nanotubes "the takeoff electrode 18 potential" is controlled as described above to regulate the tube current because the cathode 14 per se has no function of controlling the tube current.

With the cathode having the emitter made of carbon nanotubes, the emitter is not required to be heated to a high temperature, so that no high-power heating power supply is needed and reduced energy consumption is obtained as compared with the conventional hot cathode.

It is required in the X-ray generator to stabilize the tube current with high accuracy, its allowable fluctuation being about 0.1 percent. To stabilize the tube current it is required to control independently the Wehnelt 12 potential and the takeoff electrode 18 potential with the use of the second power supply 44 and the third power supply 46 respectively. If the takeoff electrode 18 would be omitted, the Wehnelt 12 potential must be controlled to regulate both the focus size on the target and the tube current, in such a case the tube current can not be precisely controlled independently of the focus size.

Figure 3:
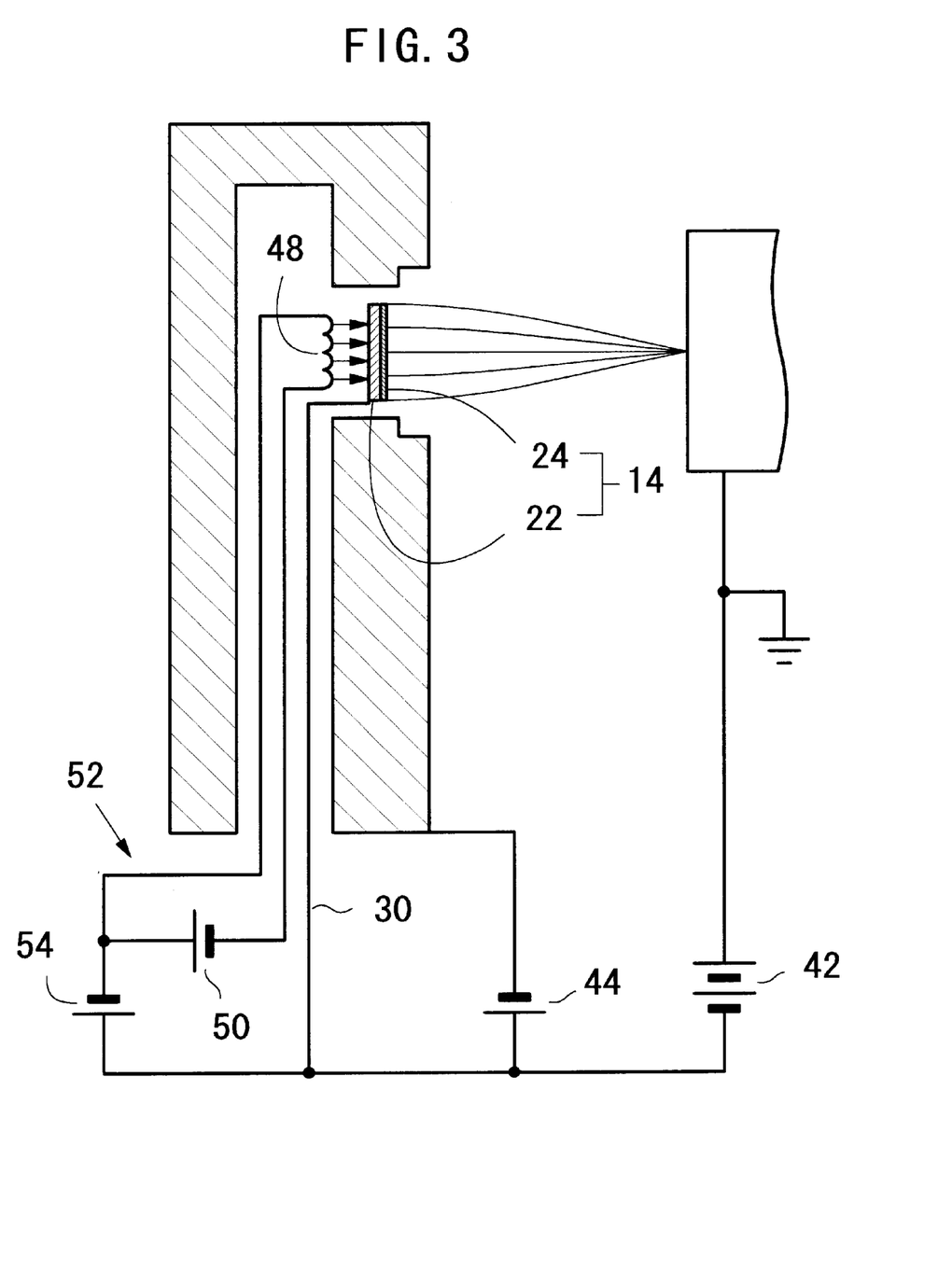
FIG. 3 is a cross-sectional view of an electron gun unit in the second embodiment of the X-ray generator according to the first aspect of this invention.

Next, the second embodiment of the X-ray generator according to the first aspect of this invention will be explained. FIG. 3 is a cross-sectional view of an electron gun unit of the second embodiment. This embodiment differs from the first embodiment in that there is no takeoff electrode while a tungsten filament 48 for electron emission is disposed behind the cathode 14. The filament 48 has both ends connected to a filament heating power supply 50 which supplies a low voltage of about zero to 2 V between the both ends of the filament 48 to control the heating temperature of the filament 48. Between such a filament-heating circuit 52 and the cathode line 30 is connected the third power supply 54, so that the filament 48 potential is set zero to minus 300 V based on the cathode 14 potential. The filament 48 potential is controlled based on the cathode 14 potential to regulate the collision energy of the electrons emitted from the filament 48 against the back of the cathode 14, so that the heating temperature of the cathode 14 is controlled and an amount of electron emission from the emitter 24 is regulated to adjust the tube current. It is noted that the cathode temperature caused by the electron collision is not so high, the temperature being in a range of the room temperature to about 100 degrees Celsius at most. The first power supply 42 and the second power supply 44 are the same as those in the first embodiment.

Figure 4:
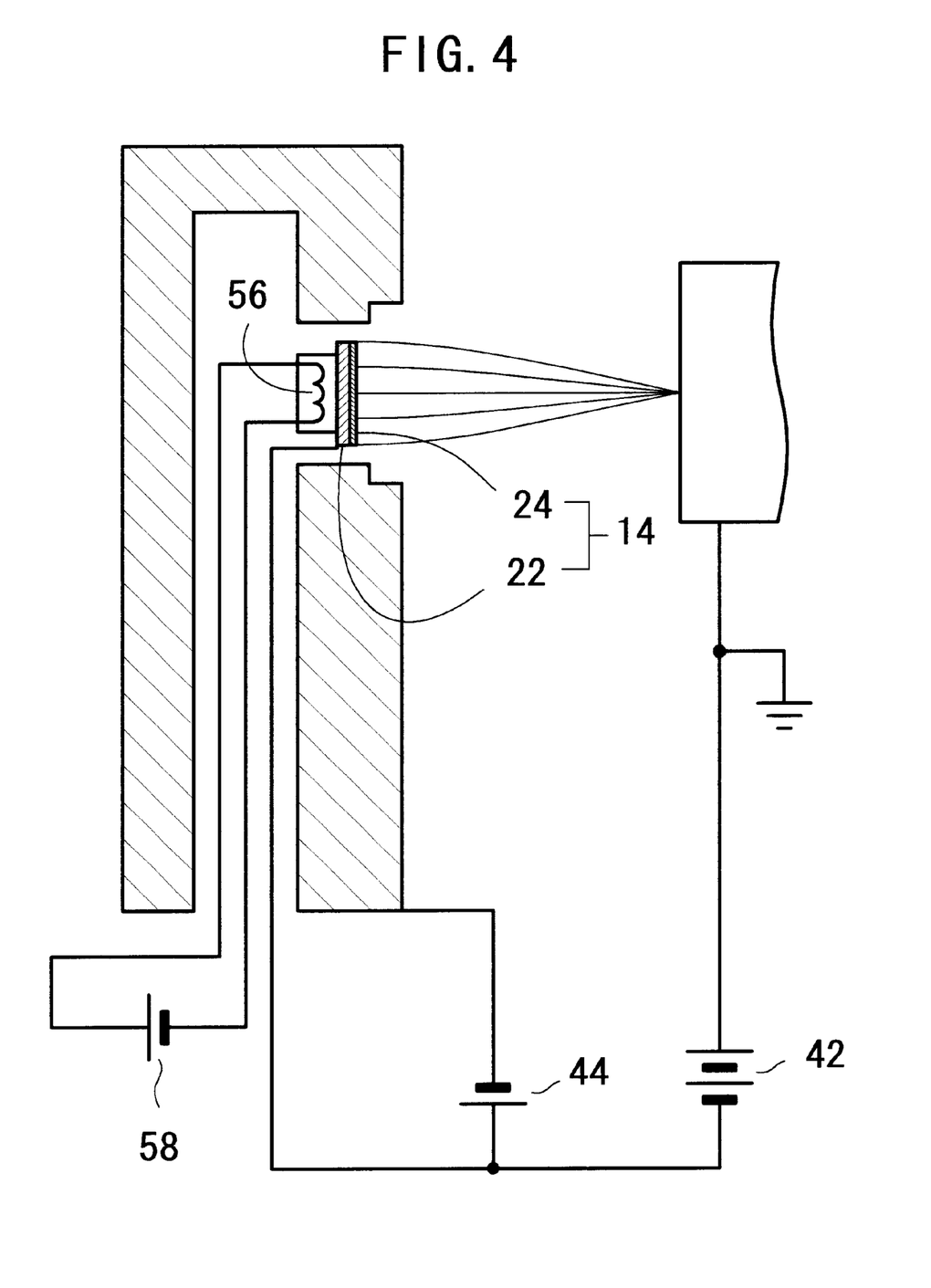
FIG. 4 is a cross-sectional view of an electron gun unit in the third embodiment of the X-ray generator according to the first aspect of this invention.

Next, the third embodiment of the X-ray generator according to the first aspect of this invention will be explained. FIG. 4 is a cross-sectional view of an electron gun unit of the third embodiment. This embodiment differs from the first embodiment in that there is no takeoff electrode while the cathode 14 has a heater 56 fixed on the back of the cathode 14. The heater 56 has both ends connected to a heater power supply 58 which controls the heating temperature of the heater 56 to regulate the temperature of the cathode 14, so that an amount of electron emission is controlled to adjust the tube current. It is noted that the cathode temperature is not so high, the temperature being in a range of the room temperature to about 100 degrees Celsius at most. The first power supply 42 and the second power supply 44 are the same as those in the first embodiment.

Although the three embodiments described above use the emitter 24 made of carbon nanotubes, an emitter made of fullerenes may be used instead.

Although the three embodiments described above use the emitter having a flat surface, the emitter may have a concave or convex surface facing the target so that electron beam focusing may be improved.

Figure 5:
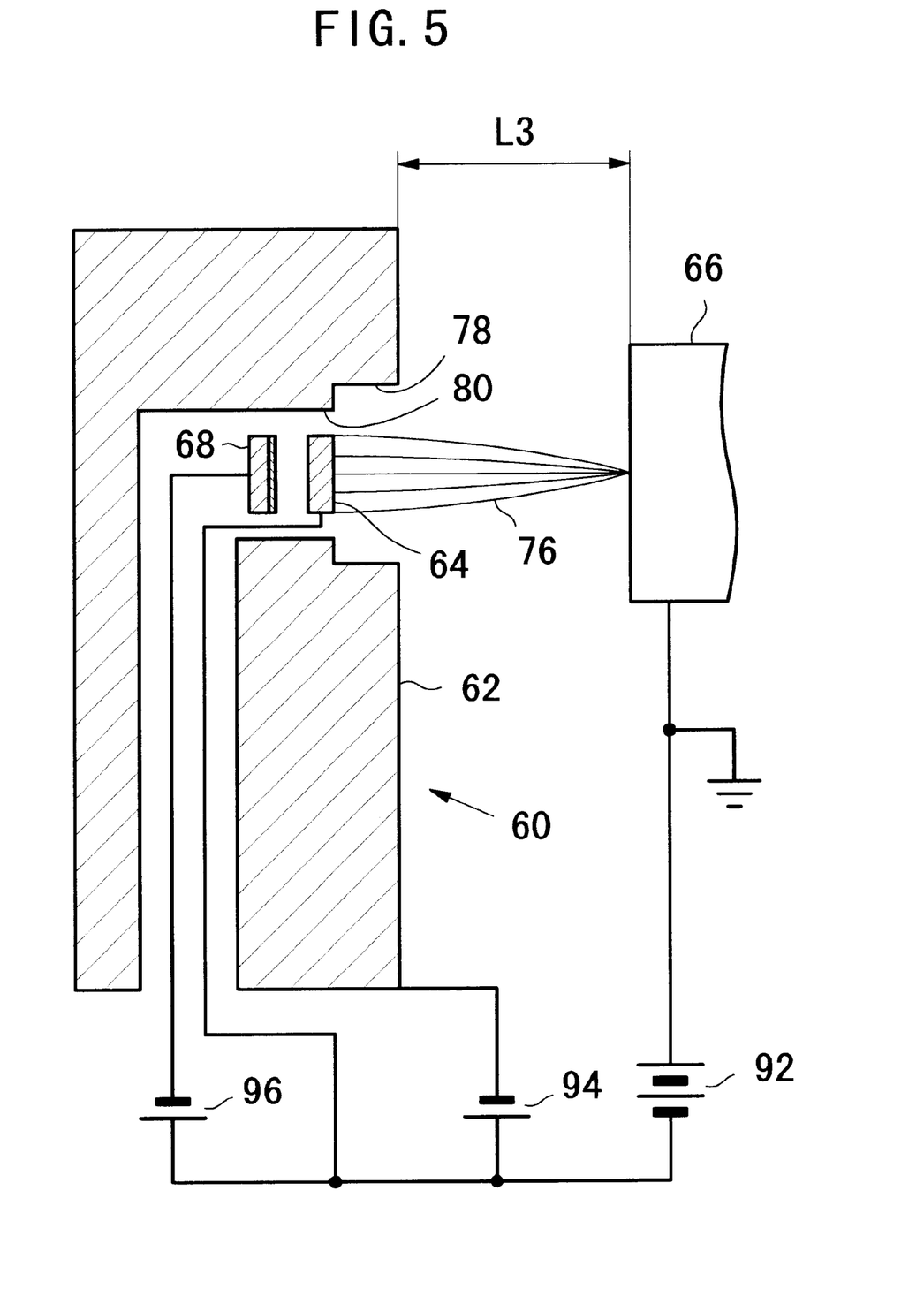
FIG. 5 is a cross-sectional view of an electron gun unit in one embodiment of the X-ray generator according to the second aspect of this invention.

Next, an X-ray generator according to the second aspect of this invention will be explained. FIG. 5 is a cross-sectional view of an electron gun unit 60 in one embodiment of the X-ray generator according to the second aspect of this invention. This cross-sectional view illustrates the electron gun unit 60 seen from its lateral side. The electron gun unit 60 has a Wehnelt 62 within which a hot cathode 64 is disposed. An electron emission electrode 68 is disposed behind and apart from the hot cathode 64. The electron emission electrode 68 functions as a bombarding electrode to heat the hot cathode 64.

A target 66 is disposed to face the electron gun unit 60. The hot cathode 64 emits hot electrons 76 which are focused by the window 78 of the Wehnelt 62 and accelerated by an electric field between the hot cathode 64 and the target 66 so as to collide against the surface of the target 66 to generate X-rays. The distance L3 between the front surface of the Wehnelt 62 and the surface of the target 66 is about 12 mm.

Figure 6:
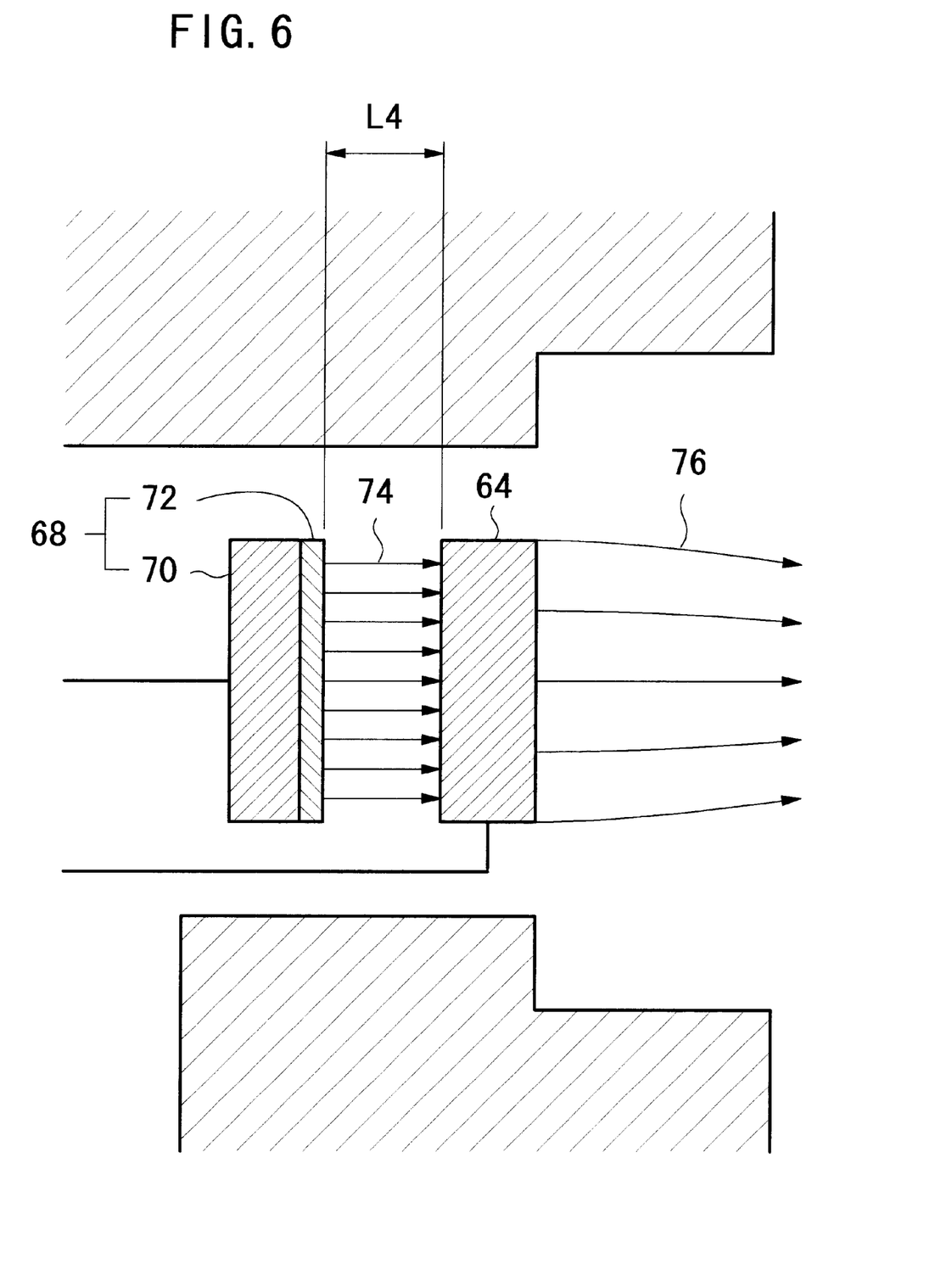
FIG. 6 is an enlarged cross-sectional view illustrating the vicinity of a hot cathode of the electron gun unit shown in FIG. 5.

FIG. 6 is an enlarged cross-sectional view illustrating the vicinity of the hot cathode 64. The electron emission electrode 68 includes a electrode base 70 having a surface on which an emitter 72 is fixed. The electrode base 70 is made of a nickel plate 0.5 mm thick. The emitter 72 is for electron emission and made of carbon nanotubes. The distance L4 between the hot cathode 64 and the electron emission electrode 68 is set 0.5 to 3.0 mm. The hot cathode 64 is made of lanthanum hexaboride 0.5 mm thick. The hot cathode 64 may have a carbon base having an electron emission surface made of lanthanum hexaboride. The hot cathode 64 may be made of other materials such as (1) tungsten only, (2) tantalum only, (3) impregnated tungsten, i.e., tungsten impregnated with barium for an improved emission characteristic or (4) thorium-added tungsten.

A voltage is supplied between the hot cathode 64 and the electron emission electrode 68 so that the potential of the electron emission electrode 68 becomes negative based on the hot cathode 64 potential, so that the emitter 72 of the electron emission electrode 68 emits electrons 74 by the field emission. With the emitter 72 made of carbon nanotubes, electron density can be high as 100 mA to 1 A per square centimeters. The electrons 74 are accelerated by the electric field to collide against the back of the hot cathode 64, so that the hot cathode 64 is heated to emit other hot electrons 76 which collide against the target 66. A preferable heating temperature of the hot cathode 64 is 1000 to 1600 degrees Celsius for lanthanum hexaboride, impregnated tungsten or thorium-added tungsten, and 2000 to 2300 degrees Celsius for tungsten or tantalum.

Figure 7:
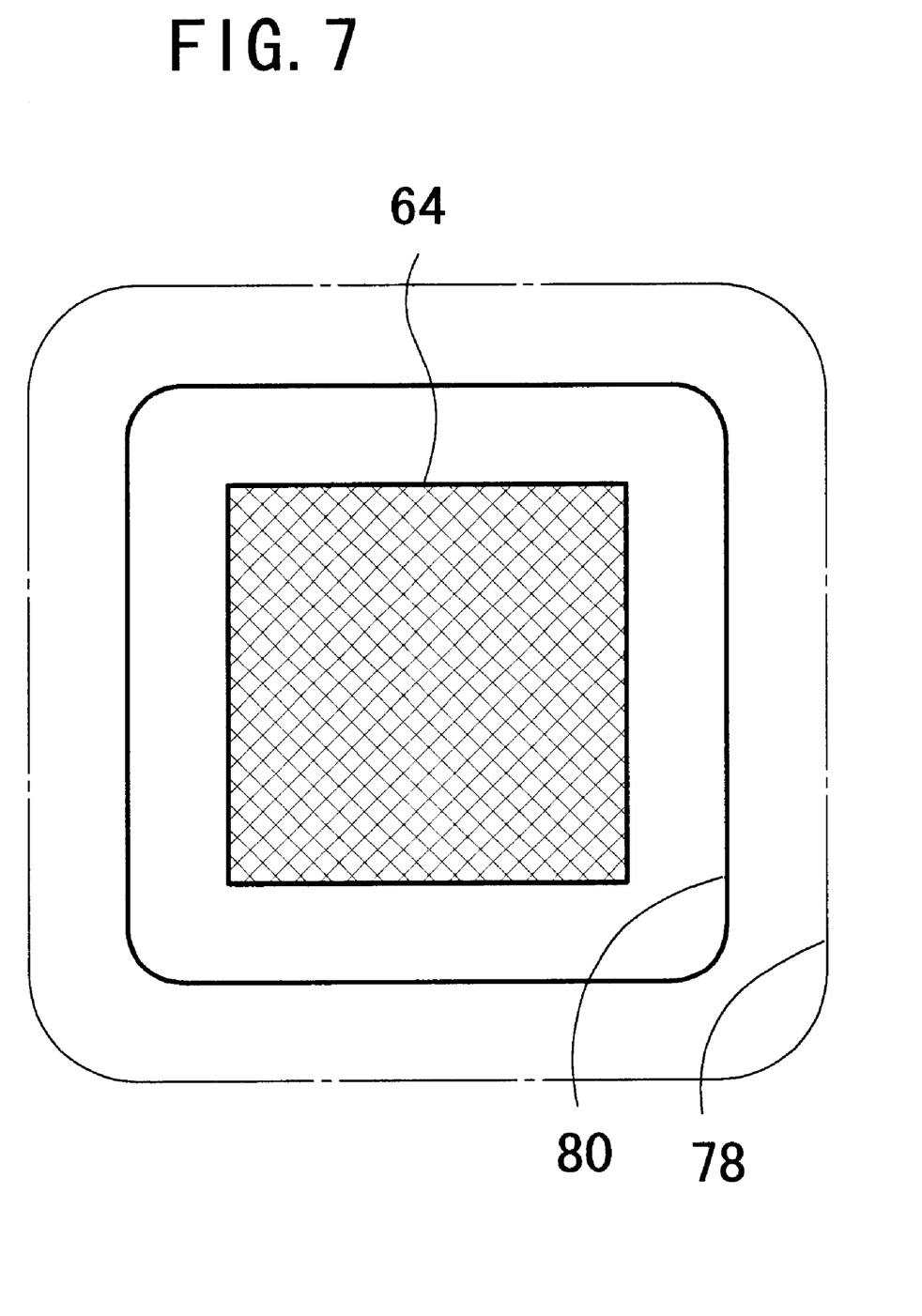
FIG. 7 is an elevation view of a hot cathode of the electron gun unit shown in FIG. 5.

FIG. 7 is an elevation view of the hot cathode 64 seen from the target side. The hot cathode 64 has a square surface and is disposed within a Wehnelt opening 80. The Wehnelt has a front surface formed with a window 78 which is larger than the opening 80. The window 78 has a size of about 7 mm square while the opening 80 has a size of about 5 mm square. The hot cathode 14 has a surface whose size is about 3 mm square.

Referring back to FIG. 5, an electric circuit of the X-ray generator will be explained. The first power supply 92 is connected between the hot cathode 64 and the target 66, so that the hot cathode 64 potential (i.e., tube voltage) is set, for example, minus 60 kV based on the target 66 potential (ordinarily grounded). The hot cathode 64 emits hot electrons 76 which is accelerated by the tube voltage to collide against the target 66. The tube current is about several tens to 300 mA. The second power supply 94 is connected between the hot cathode 64 and the Wehnelt 62, so that the Wehnelt 62 potential is set zero to minus 1000 V based on the hot cathode 64 potential. The hot cathode 64 emits hot electrons 76 which are focused by the Wehnelt window 78, whose potential is negative based on the hot cathode 64 potential, on the predetermined region of the surface of the target 66. Thus the second power supply 94 is for controlling the Wehnelt 62 potential based on the hot cathode 64 to focus the hot electrons 76 from the hot cathode 64 on the target 66. The second power supply 94 is controlled to adjust the focus size on the target 66.

The third power supply 96 is connected between the hot cathode 64 and the electron emission electrode 68, so that the potential of the electron emission electrode 68 is set a suitable potential within a range of zero to 1000 V, for example minus 500 V, based on the hot cathode 64 potential. The electric field between the hot cathode 64 and the electron emission electrode 68 is set preferably 1000 to 6000 V/mm. The potential of the electron emission electrode 68 is controlled based on the hot cathode 64 potential so as to regulate the current of the electrons 74 (see FIG. 6) from the hot cathode 64. The current is about 1 to 10 mA. The current value determines the heating temperature of the hot cathode 64, and the heating temperature determines the current of the hot electrons 76 from the hot cathode 64 (i.e., tube current). Therefore, the third power supply 96 is controlled so as to regulate the tube current of the X-ray generator.

The hot cathode of this X-ray generator is not the direct-heating type in which a current flows directly through the hot cathode to cause self-heating by resistance, so that it requires no conventional large-current high-voltage cable. The X-ray generator has a closed circuit comprised of the electron emission electrode 68, the hot cathode 64 and the third power supply 96. Through the closed circuit flows a current (hereinafter referred to as heating current) which is very small as compared with the conventional filament current. Through the high-voltage cable connected to the X-ray generator flows a current which is the sum of the tube current and the heating current described above. The tube current is about several tens to 300 mA and the heating current is about 1 to 10 mA, so that through the high-voltage cable flows a current of about 300 mA at most. Therefore, no thick cable, for a high-voltage and a large-current, is required and thin high-voltage cables on the market are sufficient. Such a thin high-voltage cable is not expensive and easy to handle. The X-ray generator does not receive a large force from the thin high-voltage cable. Since a large current does not flow the high-voltage cable, the connector between the X-ray generator and the high-voltage cable may not be a design for bearing heat generation. The high-voltage cables connected to the X-ray generator include three cables which are a cable connected to the electron emission electrode 68, a cable connected to the hot cathode 64 and a cable connected to the Wehnelt 62. The target 66 is grounded along with the casing of the X-ray generator, so that no high-voltage cable is required for the target 66.

Although the above-described embodiment of the second aspect of this invention uses the emitter 72 made of carbon nanotubes, an emitter made of fullerenes may be used instead.

What is claimed is:

1. An X-ray generator comprising:
   (a) a Wehnelt;
   (b) a cathode disposed within said Wehnelt and having emitter means made of carbon nanotubes;
   (c) a target disposed so as to face said cathode;
   (d) a takeoff electrode disposed near said cathode;
   (e) a first power supply connected between said cathode and said target so as to control a target potential based on a cathode potential;
   (f) a second power supply connected between said cathode and said Wehnelt so as to control a Wehnelt potential based on the cathode potential; and
   (g) a third power supply connected between said cathode and said takeoff electrode so as to control a takeoff electrode potential based on the cathode potential.

2. An X-ray generator comprising:
   (a) a Wehnelt;
   (b) a cathode disposed within said Wehnelt and having emitter means made of carbon nanotubes;
   (c) a target disposed so as to face said cathode;
   (d) an electron emission source disposed behind said cathode so that electrons emitted from said electron emission source collide against a back of said cathode;
   (e) a first power supply connected between said cathode and said target so as to control a target potential based on a cathode potential;
   (f) a second power supply connected between said cathode and said Wehnelt so as to control a Wehnelt potential based on the cathode potential; and
   (g) a third power supply connected between said cathode and said electron emission source so as to control an electron emission source potential based on the cathode potential.

3. An X-ray generator comprising:
   (a) a Wehnelt;
   (b) a cathode disposed within said Wehnelt and having emitter means made of carbon nanotubes;
   (c) a target disposed so as to face said cathode;
   (d) heater means attached to said cathode;
   (e) a first power supply connected between said cathode and said target so as to control a target potential based on a cathode potential;
   (f) a second power supply connected between said cathode and said Wehnelt so as to control a Wehnelt potential based on the cathode potential; and
   (g) a third power supply connected to said heater means so as to control a heating temperature of said heater means.

4. An X-ray generator comprising:
   (a) a hot cathode which is not a direct-heating type;
   (b) a target disposed so as to face said hot cathode;
   (d) an electron emission electrode disposed behind and apart from said hot cathode and having emitter means made of fullerenes; and
   (e) a power supply connected between said hot cathode and said electron emission electrode to provide said electron emission electrode with a negative potential based on a hot cathode potential so that said electron emission electrode emits electrons which collide against said hot cathode to heat it.

5. An X-ray generator comprising:
   (a) a Wehnelt;
   (b) a cathode disposed within said Wehnelt and having emitter means made of fullerenes;
   (c) a target disposed so as to face said cathode;
   (d) a takeoff electrode disposed near said cathode;
   (e) a first power supply connected between said cathode and said target so as to control a target potential based on a cathode potential;

(f) a second power supply connected between said cathode and said Wehnelt so as to control a Wehnelt potential based on the cathode potential; and (g) a third power supply connected between said cathode and said takeoff electrode so as to control a takeoff electrode potential based on the cathode potential.

6. An X-ray generator comprising:

(a) a Wehnelt;

(b) a cathode disposed within said Wehnelt and having emitter means made of fullerenes;

(c) a target disposed so as to face said cathode;

(d) an electron emission source disposed behind said cathode so that electrons emitted from said electron emission source collide against a back of said cathode;

(e) a first power supply connected between said cathode and said target so as to control a target potential based on a cathode potential;

(f) a second power supply connected between said cathode and said Wehnelt so as to control a Wehnelt potential based on the cathode potential; and (g) a third power supply connected between said cathode and said electron emission source so as to control an electron emission source potential based on the cathode potential.

7. An X-ray generator comprising:

(a) a Wehnelt;

(b) a cathode disposed within said Wehnelt and having emitter means made of fullerenes;

(c) a target disposed so as to face said cathode;

(d) heater means attached to said cathode;

(e) a first power supply connected between said cathode and said target so as to control a target potential based on a cathode potential;

(f) a second power supply connected between said cathode and said Wehnelt so as to control a Wehnelt potential based on the cathode potential; and (g) a third power supply connected to said heater means so as to control a heating temperature of said heater means.

8. An X-ray generator comprising:

(a) a hot cathode which is not a direct-heating type;

(b) a target disposed so as to face said hot cathode;

(d) an electron emission electrode disposed behind and apart from said hot cathode and having emitter means made of carbon nanotubes; and (e) a power supply connected between said hot cathode and said electron emission electrode to provide said electron emission electrode with a negative potential based on a hot cathode potential so that said electron emission electrode emits electrons which collide against said hot cathode to heat it.

9. An X-ray generator comprising:

(a) a Wehnelt;

(b) a hot cathode disposed within said Wehnelt and being not a direct-heating type;

(c) a target disposed so as to face said hot cathode;

(d) an electron emission electrode disposed behind and apart from said hot cathode and having emitter means made of carbon nanotubes;

(e) a first power supply connected between said hot cathode and said target so as to control a target potential based on a hot cathode potential;

(f) a second power supply connected between said hot cathode and said Wehnelt so as to control a Wehnelt potential based on the hot cathode potential; and (g) a third power supply connected between said hot cathode and said electron emission electrode to provide said electron emission electrode with a negative potential based on the hot cathode potential so that said electron emission electrode emits electrons which collide against said hot cathode to heat it.

10. An X-ray generator according to claim 9, wherein said negative potential is controlled so as to regulate a tube current.

11. An X-ray generator according to claim 9, wherein at least an electron emission region of said hot cathode is made of lanthanum hexaboride.

12. An X-ray generator comprising:

(a) a Wehnelt;

(b) a hot cathode disposed within said Wehnelt and being not a direct-heating type;

(c) a target disposed so as to face said hot cathode;

(d) an electron emission electrode disposed behind and apart from said hot cathode and having emitter means made of fullerenes;

(e) a first power supply connected between said hot cathode and said target so as to control a target potential based on a hot cathode potential;

(f) a second power supply connected between said hot cathode and said Wehnelt so as to control a Wehnelt potential based on the hot cathode potential; and (g) a third power supply connected between said hot cathode and said electron emission electrode to provide said electron emission electrode with a negative potential based on the hot cathode potential so that said electron emission electrode emits electrons which collide against said hot cathode to heat it.

13. An X-ray generator according to claim 12, wherein at least an electron emission region of said hot cathode is made of lanthanum hexaboride.

14. An X-ray generator according to claim 12, wherein said negative potential is controlled so as to regulate a tube current.

* * * * *